UNITED STATES PATENT OFFICE 2,585,461

METHOD OF MAKING FLUORESCENT ZINC OXIDE

Benjamin L. Hirsch, Ottawa Hills, Ohio

No Drawing. Application January 4, 1946,
Serial No. 639,153

11 Claims. (Cl. 23—148)

The invention relates to fluorescent material, particularly pigments, and the preparation thereof.

Ordinary zinc oxide may exhibit a very faint fluorescence under ultra-violet light. As pointed out by Eisenbrand and Siewert in Archiv der Pharmazie 1934, vol. 272, pages 440–451, the fluorescence exhibited by ordinary zinc oxide is generally so faint that it can scarcely be detected.

In the same publication, Eisenbrand and Siewert show that the fluorescence of zinc oxide can be increased by heating it in an atmosphere of hydrogen or an atmosphere of hydrogen and water vapor. Similar results are reported by The British Thomson-Houston Company in British Patent No. 558,213 and by Beutel and Kutzelnigg in Monatsheft für Chemie, 1932, vol. 61, pages 69 to 86.

Heating zinc oxide in an atmosphere containing hydrogen, as described in these publications, gives extremely variable results. The intensity of the fluorescence of a product thus prepared is very rarely more than about half that of the lowest-intensity fluorescent pigments that are in commercial use. As pointed out by Eisenbrand and Siewert, the particle size of zinc oxide increases rapidly during the heating in an atmosphere containing hydrogen. This increase in particle size seriously impairs the value of the zinc oxide as a pigment, and substantial reduction of the particle size by grinding impairs the fluorescence. Eisenbrand and Siewert recommend that appreciable fluorescence be taken as an indication of coarseness of any zinc oxide on the ground that they found appreciable fluorescence to be unobtainable without great increase in particle size.

The principal object of the invention is the preparation of an oxide of zinc in a state in which it has greatly improved and uniformly high fluorescence and very fine particle size. More specific objects and advantages are apparent from the description, which merely discloses and illustrates the invention and which is not intended to impose limitations upon the claims.

Properties and uses of the product

An oxide of zinc prepared in accordance with the invention fluoresces with a brightness approximating that of the best inorganic fluorescent pigments in commercial use, upon exposure to cathode ray, near ultra-violet radiation having a wave-length of about 3,000 to about 4,000 Angstrom units, and shorter wave-length ultra-violet radiation as low as the radiation of a mercury vapor lamp, having a wave-length of 2537 Angstrom units. It has particular sensitivity to a wave-length of 3650 Angstrom units. It fluoresces with a brilliant white light which has a yellowish-green cast and therefore is "soft" or pleasing to the eyes. It does not appreciably darken or lose its fluorescence upon long exposure to ultra-violet radiation and high humidity.

The fluorescence of this material reaches its maximum brilliance instantly upon exposure of the material to the exciting radiation, and is cut off very sharply upon cessation of the exciting radiation. The material thus is suitable for the production of television screens as well as coatings for fluorescent lamps. The quick "cutoff" makes the material highly advantageous for military use in the production of fluorescent dials and charts.

An oxide of zinc in fluorescent form embodying the invention, except for the fact that it is fluorescent, has the same properties as ordinary zinc oxide, i. e., it is a snowy white material very useful as a pigment, has high "hiding power" and tinting power because of its fineness and is an excellent reflector of day light or other light.

An oxide of zinc in fluorescent form embodying the invention may be obtained in various particle sizes ranging down to particles so fine as to be barely visible under an ordinary microscope. The material of extremely fine particle size is of the type commonly called an "amorphous powder" but it may consist of minute crystals.

Although grinding thus is not necessary to produce fineness in a material embodying the invention, other materials such as pigments may be ground with a material embodying the invention for the purpose of producing an intimate mixture.

A fluorescent pigment embodying the invention may be incorporated like the best zinc oxide pigments in paints, enamels, lacquers, printing inks, plastics, ceramics, textiles and the like. In order to produce various colors of fluorescent light or reflected visible light, the present pigment may be mixed with various other fluorescent or non-fluorescent pigments. For example, a zinc sulphide that fluoresces blue or bluish white can be mixed with a fluorescent oxide of zinc in various proportions to give a white or variously tinted fluorescence. A fluorescent oxide of zinc may be mixed with such nonfluorescent pigments as white lead, lithopone, titanium dioxide and diatomaceous earth. The present pigment does not react with lead or iron pigments, and the effect of mixing it with other pigments is merely to dilute it so as to reduce the intensity of the light produced by its fluorescence. The present pigment may be modified by using it as a base in the preparation of color lakes, as by adsorption of dyes on the surface of the fluorescent oxide of zinc.

When used in fluorescent paper, fluorescent paints, fluorescent printing inks or fluorescent powder for dusting on surfaces, the present pigment may be illuminated by "black light" or daylight to produce many useful effects. Activation of a fluorescent pigment embodying the invention by means of "black light" may be used to provide selective illumination of markings without any accompanying glare in the case of fluorescent automobile instrument panel dials and knobs, fluorescent paving bricks or other fluorescent traffic markings, railroad signal markings, modeling clay and night targets for archery and other games. The present pigment may also be used to produce "invisible" markings such as laundry markings, which can be observed only under "black light" (near ultra-violet radiation).

The present pigment may be used in the manufacture of paper or decalcomanias or may be used in coating, sizing or impregnating paper. Because the present pigment may be made much finer than other fluorescent pigments, luminosity may be obtained by the use of smaller amounts in a matrix such as paper so that the strength of the paper is not impaired as it is when it is necessary to employ larger amounts of other coarser pigments. Paper so prepared may be used in applications requiring illumination by "black light," but such paper has the advantage of improved brilliance when illuminated by ordinary daylight. A photograph printed on such paper has a pleasing glow or reflection caused by the generation of fluorescent light, which makes the details of the photograph stand out with exceptional clarity. Such paper is useful for photographs and drawings from which photoengravings or blueprints are made. Photographs and drawings printed on ordinary paper may be dusted with the present pigment to bring out the details of the photograph or drawing in a similar manner. An analogous effect may be produced by suspending the present pigment in offset solutions which are sprayed upon freshly printed matter.

Ordinary paper printed with an ink containing the present fluorescent pigment may be illuminated by "black light" and photographed to produce "direct positives" in photoengraving and similar applications. Finger prints made with such an ink are likewise useful for the production of "direct positives" by photographing. The present pigment may also be used to make "carbon paper" for producing copies that can be read by "black light."

In order to utilize the ultra-violet radiation present in daylight and to provide more efficient lighting, a pigment embodying the invention may be used in coatings for Venetian blinds and for interior decorating and as a pigment for awnings, wall paper, linoleum, oilcloth, plaster and concrete.

Because of its ability to absorb ultra-voilet light, transforming it into visible light instead of heat, the present pigment may be used for protective purposes in rubber compositions and in paints, and also in coatings for preventing overheating of gasoline storage tanks.

The present pigment may be used to produce pencils or chalk for making markings to be illuminated by "black light." Markings made by chalk containing the present pigment have added visibility when illuminated by daylight.

The present pigment may be used to give added brilliance to motion picture screens, lighting reflectors, shoe whiting, paints for exterior decorating, golf balls, tennis balls and the like. The pigment may also be used in under coats for phosphorescent paints.

When used in photographic paper or film, the present pigment provides a background of improved reflective power and affords a means of increasing the speed and contrast of the emulsion.

Use of the present pigment as an inside or outside coating for incandescent lamp bulbs improves the quality of light emitted by converting ultra-violet radiation to visible light and gives the light a pleasing greenish cast.

The present pigment has been found to be highly advantageous for use in cosmetics. The human skin has a natural fluorescence that is masked by face powders and other cosmetics which tend to produce a dull appearance. It has been found that a powder base, cream, powder or other cosmetic containing the present pigment gives the appearance of a natural glow because of the fluorescence of the pigment. A cosmetic containing the present pigment provides an attractive glowing color similar to the glowing color of a healthy skin, whereas ordinary cosmetics produce only a flat or nonfluorescent color. The present pigment is believed to be the first fluorescent pigment sufficiently inert and fine to be suitable for general use in cosmetics. Although fluorescent pigments heretofore known are sensitive to the ultra-violet radiation present in daylight, they would be too dangerous for use in cosmetics because of their toxic character.

*Nature of the product*

The preferred product embodying the invention is an oxide of zinc that when subjected to ultra-violet radiation having a wave length of 2537 angstrom units fluoresces with an intensity substantially as great as phosphorescent zinc sulphide. For example, one oxide of zinc embodying the invention has been found to fluoresce under such radiation with an intensity identical with that of New Jersey Zinc Company's phosphorescent zinc sulphide 2330, which is a standard grade, the radiation being produced by a quartz mercury arc lamp, and the intensity of the fluorescence being measured with a Macbeth illuminometer. Under radiation of the same wave length, an oxide of zinc embodying the invention fluoresces with an intensity not less than about one-fourth that of synthetic willemite. (Under illumination by ultra-violet light of 2537 Å. wavelength, the instant zinc oxide fluoresces with a relative intensity of 100; zinc sulfide 2330 with a relative intensity of 100 and synthetic willemite with a relative intensity of 370, measured with a Macbeth illuminometer.)

The same sample of fluorescent zinc oxide embodying the invention, under radiation having a wave length of 3650 angstrom units, has been found to fluoresce with about 40 per cent of the intensity of the same standard grade of phosphorescent zinc sulphide, the radiation being furnished by a quartz monochrometer. At both of these wave lengths the sample of fluorescent zinc oxide was found to fluoresce with an intensity more than twice that of New Jersey Zinc Company's fluorescent zinc sulphide No. 2265 and about 70 per cent greater than that of New Jersey Zinc Company's fluorescent zinc sulphide No. 2235.

Other samples of fluorescent zinc oxide embodying the invention have been found to fluoresce with even greater intensity.

An oxide of zinc embodying the invention is not known to have any chemical property different from that of ordinary zinc oxide. The only physical property by which an oxide of zinc embodying the invention may be distinguished from other zinc oxides is the much greater intensity of fluorescence of an oxide of zinc embodying the invention.

The fluorescence of a zinc oxide embodying the invention may be due to the presence of isolated zinc atoms or isolated molecules of a suboxide of zinc in the crystal lattice. However, as in the case of other phosphores, any foreign atoms or molecules that may be the source of the fluorescence are so few in number that they cannot be identified by any chemical or physical means.

An oxide of zinc embodying the invention consists in the highly fluorescent product of the exposure at temperatures of incandescence, to an atmosphere that contains a gas capable of reducing zinc oxide and is substantially free from gases that react otherwise with the zinc oxide, of a French process zinc oxide that under said conditions agglomerates no more than it would under similar conditions in an atmosphere of sulphur dioxide, preferably a French process zinc oxide that contains a trace of sulphur dioxide.

A preferred oxide of zinc embodying the invention consists in the highly fluorescent product of the exposure of a French process zinc oxide at temperatures of incandescence to an atmosphere that contains sulphur dioxide and a gas capable of reducing zinc oxide and is substantially free from gases that react otherwise with the zinc oxide.

A fluorescent product embodying the invention may be made as fine as ordinary fluorescent zinc sulphide pigments and much finer than phosphorescent zinc sulphide pigments. The particles of an oxide of zinc embodying the invention may have an average diameter from about two to about three microns and a surface area from about 0.4 to about 0.5 square meter per gram, as determined by nitrogen permeability.

Requirements of starting material

The present invention is based upon the discovery that an oxide of zinc having greatly improved and uniformly high fluorescence may be prepared by using a particular type of zinc oxide as the starting material. More specifically, the starting material used in the practice of the present invention is a French process zinc oxide (i. e., a zinc oxide made by burning zinc metal) that may be identified by certain properties which distinguish it from other French process zinc oxides. A French process zinc oxide suitable for use as the starting material for the preparation of a fluorescent product in accordance with the invention may be distinguished by the fact that when maintained at temperatures of incandescence, in any atmosphere that contains a gas capable of reducing zinc oxide and is substantially free from gases that react otherwise with the zinc oxide, agglomerates no more than it would under similar conditions in an atmosphere of sulphur dioxide. For making such comparison, the preferred temperature is 900° C., the preferred time at such temperature is one half hour and the preferred atmosphere containing a reducing gas is an atmosphere consisting of 28% carbon monoxide, 3.5% carbon dioxide, 66% nitrogen and 2.5% hydrogen by volume, although an atmosphere of pure carbon monoxide may be used. When such comparison is made, the zinc oxide being tested preferably is sifted through a fine screen into the container in which it is to be tested, so as to keep it in a fluffy condition.

The type of French process zinc oxide that may be thus identified as a proper starting material is relatively rare among commercially available French process zinc oxides. However, any French process zinc oxide may be converted by a very simple step into a proper starting material for use in preparing a fluorescent product in accordance with the invention. Such step consists in exposing a French process zinc oxide to an atmosphere that contains sulphur dioxide and is substantially free from gases that react with the zinc oxide otherwise than by reduction. The concentration of sulphur dioxide in such atmosphere may vary from a trace to 100%.

The temperature at which the zinc oxide is exposed to such atmosphere may be any temperature from room temperature to temperatures at which the zinc oxide is incandescent. It is preferable to carry out this step at room temperature for the sake of convenience and also because the particle size of zinc oxide gradually increases at high temperatures.

The time required for such step is simply a time long enough to impart to the zinc oxide the properties which are described above as necessary to make the zinc oxide a proper starting material for the preparation of the fluorescent product. The time required varies with the concentration of sulphur dioxide in the atmosphere employed, which as stated above may vary from a trace to 100%.

Such step preferably is carried out by exposing the French process zinc oxide to an atmosphere of substantially pure sulphur dioxide at room temperature. Under these conditions an exposure of about one minute is sufficient if the zinc oxide contains the normal moisture content of about .075% by weight. If the zinc oxide contains less than about .075% moisture, it is desirable to add moisture thereto in order to shorten the time for which it is necessary to expose the zinc oxide to an atmosphere containing sulphur dioxide.

In the rare cases in which a commercial French process zinc oxide is found to be a proper starting material for use in the preparation of a fluorescent product in accordance with the invention, the zinc oxide may have been exposed to sulphur dioxide in one of the final stages of its manufacture. Such a zinc oxide may show a trace of sulphur dioxide when subjected to the starch-iodine test. A U. S. P. grade French process zinc oxide that contains a trace of sulphur dioxide is very rare because it is difficult to produce a French process zinc oxide of acceptable purity when sulphur dioxide is present in one of the final stages of its manufacture. The presence of a trace of sulphur dioxide in a French process zinc oxide is a reliable indication that the zinc oxide is a proper starting material for use in the preparation of a fluorescent product in accordance with the invention.

The starting material for use in the preparation of a fluorescent product in accordance with the invention, which must have the properties hereinbefore described, is preferably U. S. P. grade. A C. P. grade, reagent grade or spectroscopically pure grade of zinc oxide can be used but ordinarily does not give an improvement in results that would compensate for its greater cost.

Preparation of the fluorescent product

A fluorescent product is prepared in accordance with the invention by maintaining a starting material having the properties hereinbefore described at temperatures of incandescence in contact with an atmosphere that contains a gas capable of reducing zinc oxide and is substantially free from gases that react otherwise with the zinc oxide, until a fluorescent product can be obtained upon cooling.

The time for which the zinc oxide must be maintained at temperatures of incandescence in contact with such an atmosphere varies with the specific temperature used. The temperatures of incandescence of zinc oxide are well known, and the preferred temperatures of incandescence for use in the practice of the invention are temperatures from about 600° C. to about 1300° C. At temperatures less than about 650° C. prolonged contact with an atmosphere containing a gas capable of reducing zinc oxide may be necessary before a fluorescent product can be obtained upon cooling. Heating at the higher temperature gradually increases the particle size of the product. It is seldom necessary to maintain the zinc oxide at temperatures of incandescence for more than an hour and sometimes not for more than about fifteen to thirty minutes. A preferred temperature range is from about 800° C. to about 1000° C. At still higher temperatures the increase in the particle size of the zinc oxide is more rapid. At temperatures greater than about 1300° C. zinc oxide is lost by volatilization.

The particle size of the product may be controlled at will and varies directly with the temperature and time of heating. A very dense product suitable for use in a dental cement may be made if the heating is at 1300° C. for eight to ten hours. Quick cooling assists in keeping the particle size to a minimum.

Thermal shock such as that produced by quenching the hot product in water may also be used to produce fine particle size.

Cooling to produce a fluorescent product may be carried out in an atmosphere containing a gas capable of reducing zinc oxide, but there is no loss of luminosity upon quick cooling in air or quenching in water. If the hot product is allowed to fall into water the water may be permitted to boil, and a stream of cool air may be passed through the water if desired. Other pigments such as white lead, lithopone, titanium dioxide or diatomaceous earth may be in suspension in the water, with or without a wetting agent, or may be added subsequently to the water in order to produce a dispersion of the fluorescent zinc oxide with the other pigments. The water may be removed from the product by decantation or filtration followed by drying.

The atmosphere in contact with which the oxide of zinc is maintained at temperatures of incandescence in the practice of the invention is an atmosphere containing a gas capable of reducing zinc oxide such as carbon monoxide or hydrogen, but is not necessarily a reducing atmosphere. It has been found that such atmosphere may contain an excess of carbon dioxide or water vapor so that it is an atmosphere capable of oxidizing zinc, so long as it contains at least a trace of carbon monoxide, hydrogen or other gas capable of reducing zinc oxide.

The atmosphere herein referred to is the atmosphere with which the zinc oxide at temperatures of incandescence is actually in contact. Such atmosphere may contain oxygen, but it would not ordinarily contain an excess of oxygen over that required to oxidize all of the carbon monoxide and hydrogen present, because in that case the atmosphere in contact with the incandescent zinc oxide would not be likely to contain any carbon monoxide or hydrogen. The presence of an excess of oxygen in an atmosphere in contact with which zinc oxide is at temperatures of incandescence ordinarily prevents the formation of a fluorescent product.

In the commercial production of zinc oxide as practiced heretofore a large excess of air is used to expedite the oxidation of the zinc at the high temperatures employed, and under such conditions the presence of a gas capable of reducing zinc oxide is precluded.

The concentration of the gas capable of reducing zinc oxide in the atmosphere used in the practice of the invention may be from a trace to 100%. The sufficiency of a trace of such a gas is understandable in view of the fact that any reaction product of such a gas in the final fluorescent product is present in such a minute amount that it cannot be identified by any chemical or physical means. The concentration of the gas capable of reducing zinc oxide in the atmosphere is not critical so long as the zinc oxide is maintained in contact with such atmosphere at temperatures of incandescence until a fluorescent product can be obtained upon cooling.

Of course it is desirable not to lose any substantial amount of the zinc oxide by reducing it to metallic zinc. Metallic zinc thus produced ordinarily is lost by volatilization and therefore does not materially contaminate the product. Reduction of the oxide to metallic zinc usually can be prevented by cessation of the heating as soon as fluorescent product can be obtained upon cooling. Reduction of the zinc oxide to metallic zinc also can be prevented by the presence of a sufficient proportion of carbon dioxide or water vapor in the atmosphere used.

The preparation of an oxide of zinc in fluorescent form can be carried out in an atmosphere consisting of carbon dioxide containing only a minute concentration of carbon monoxide. Such an atmosphere actually is capable of oxidizing zinc to zinc oxide. The atmosphere used may consist of pure carbon monoxide, but the presence of carbon dioxide, formed by the reduction of minute quantities of the zinc oxide, is not precluded even when the atmosphere supplied consists of pure carbon monoxide.

An atmosphere consisting of pure carbon monoxide or pure hydrogen or a mixture of carbon monoxide and hydrogen in any proportion whatsoever gives satisfactory results when brought into contact with the zinc oxide in the practice of the invention. An atmosphere consisting of hydrogen and water vapor gives even better results than the use of pure hydrogen, and the water vapor in such an atmosphere may be present in any concentration from a trace up to saturation.

An atmosphere containing carbon monoxide may be obtained in any convenient manner, for example by the incomplete combustion or cracking of a carbonaceous material such as carbon, carbon monoxide, methane, ethane, propane, butane, benzene, oil, producer gas, water gas, coal, coke, wood, or cellulosic material. An atmosphere containing carbon monoxide may also be produced by contacting air or carbon dioxide with carbon at an elevated temperature or by reducing carbon dioxide in any desired manner. An atmosphere that gives good results is one consisting substantially of about 35% carbon monoxide and 65% nitrogen obtained by passing air in contact with hot charcoal. An excellent product may be produced by maintaining zinc oxide in contact with such an atmosphere at about 900° C. for about 25 minutes and then cooling rapidly in the same atmosphere or in air.

Nitrogen and other inert gases may be present in the atmosphere used, and the atmosphere may contain both carbon monoxide and hydrogen, either with or without carbon dioxide and water vapor.

The atmosphere supplied to the chamber containing the incandescent zinc oxide may contain reducing gases other than carbon monoxide and hydrogen, such as methane. If methane is used, however, care should be taken to avoid serious contamination of the product with carbon formed by decomposition of the methane. Contamination of the zinc oxide with free carbon may cause excessive formation and loss of metallic zinc. Such contamination may be avoided by introducing just enough air or oxygen to oxidize the carbon or to prevent its deposition.

The atmosphere that is supplied to the chamber containing the incandescent zinc oxide may contain any other gas capable of reducing zinc oxide, such as ethane, propane, butane or any other hydrocarbon, or a carbohydrate. Such gases, like methane, tend to decompose at the operating temperature, and the introduction of a slight amount of air, oxygen, or water vapor usually is required to prevent serious contamination of the product with carbon. Because of the decomposition of such gases the atmosphere actually in contact with the zinc oxide in each case may contain hydrogen or carbon monoxide.

Nitrogen and other inert gases may be present in any proportion in the atmosphere used. Of course any atmosphere to which the zinc oxide is exposed should be substantially free from gases that react with the zinc oxide otherwise than by reduction. The term "substantially free from gases that react with the zinc oxide otherwise than by reduction" is used herein to mean that the concentration of such gases is low enough so that under the conditions of operation used the zinc oxide is not substantially contaminated by reaction products of such gases with the zinc oxide, such as a chloride or other zinc compound.

In summary, the atmosphere to which the zinc oxide is exposed at temperatures of incandescence in the practice of the invention may have any composition whatsoever so long as it contains at least a trace of a gas capable of reducing zinc oxide and is substantially free from gases that react otherwise with the zinc oxide.

If such atmosphere contains at least a trace of sulphur dioxide, the zinc oxide that is exposed to such atmosphere in the practice of the invention may be any French process zinc oxide whatsoever, because the mere presence of a trace or more of sulphur dioxide in the atmosphere converts the French process zinc oxide into a proper starting material for the preparation of a fluorescent product in accordance with the invention. Since the French process zinc oxide is properly conditioned or converted into a proper starting material by the presence of sulphur dioxide in the atmosphere containing a gas capable of reducing zinc oxide, mere continued maintenance of the zinc oxide at temperatures of incandescence in contact with the same atmosphere permits a highly fluorescent product embodying the invention to be obtained upon cooling.

The sulphur dioxide present may be introduced into the atmosphere from sulphur-containing fuel, or any sulphur-containing material, such as free sulphur, a sulphide, or a sulphite, which upon heating provides sulphur dioxide. The sulphur dioxide in the atmosphere may be provided by mixing up to about one per cent by weight of such a sulphur-containing material with zinc oxide from which a fluorescent product is to be produced. "Zinc oxide containing sulphur dioxide," as used herein, includes zinc oxide containing sulphur dioxide in the form of zinc sulphite.

The sulphur dioxide may also be formed as the result of the reduction of a sulphate by carbon or another reducing agent.

An important advantage of the present process is that it is not necessary to add any activating substance to the zinc oxide in order to obtain a fluorescent product.

Furnaces or crucibles in which the zinc oxide is heated may be made of a wide variety of materials, such as nickel, porcelain, graphite, Alundum, quartz, clay or even iron.

A convenient method of preparation consists in passing a French process zinc oxide that has the properties necessary to make it a proper starting material through a rotary furnace at a temperature of incandescence while maintaining in the furnace an atmosphere containing a gas capable of reducing zinc oxide. Another method consists in dropping such a zinc oxide through a tall vertical muffle containing such an atmosphere, in which the zinc oxide becomes heated to incandescence. In either case the product preferably is cooled in the air or in water.

An atmosphere containing carbon monoxide may be provided in a chamber in which the zinc oxide is maintained at temperatures of incandescence either by introducing into the chamber a stream of gas containing carbon monoxide, such as producer gas or water gas, or by maintaining in the chamber solid carbonaceous material which reacts with oxygen or carbon dioxide in the chamber to produce carbon monoxide.

A very simple and advantageous method embodying the invention for preparing an oxide of zinc in a highly fluorescent state constitutes a simple modification of an ordinary French process by which zinc oxide is produced from zinc smelter. In such a modified French process embodying the invention, the zinc oxide is initially produced in the form of a cloud in an atmosphere that contains at least a trace of sulphur dioxide, and a gas capable of reducing zinc oxide, and the zinc oxide, as initially formed, is at temperatures of incandescence in contact with such atmosphere so that a fluorescent product is obtained upon cooling.

When a French process zinc oxide is brought into contact with an atmosphere containing sulphur dioxide and a gas capable of reducing zinc oxide, it may be necessary to hold the zinc oxide at temperatures of incandescence in contact with such atmosphere for fifteen minutes or longer in order to complete the conversion of the zinc oxide to a highly fluorescent product. However, in a modified French process embodying the invention, the zinc oxide is actually formed in such an atmosphere, and it is in such intimate contact with the atmosphere as it is formed that the production of a highly fluorescent product is substantially instantaneous. Such a zinc oxide may be considered to be highly fluorescent at the instant when it is formed.

The gas capable of reducing zinc oxide that is present in the atmosphere used in a modified French process embodying the invention may consist of carbon monoxide or hydrogen resulting from the reaction of zinc metal with carbon dioxide or water vapor to form the zinc oxide. However, it is preferably that the atmosphere used contain carbon monoxide or hydrogen in excess of that formed in the production of the zinc oxide, although the excess should not be great enough to interfere substantially with the initial formation of the zinc oxide by oxidation of zinc metal.

In a modified French process embodying the invention zinc vapor may be produced by vaporizing spelter. The resulting vapor is then burned by reacting the zinc vapor with carbon dioxide or water vapor in an atmosphere containing sulphur dioxide, a fluorescent product being produced as hereinbefore described.

*Example 1*

Two 50 gram samples of a French process U. S. P., C. P. or reagent grade zinc oxide are sifted into two quartz dishes. One dish is held at 900° C. for one-half hour in an atmosphere of sulphur dioxide, and the other dish is held at 900° C. for one-half hour in an atmosphere consisting of 28% carbon monoxide, 3.5% carbon dioxide, 66% nitrogen and 2.5% hydrogen, obtained by passing air through a bed of charcoal at about 600° C. The samples are then allowed to cool and examined. If the sample heated in the charcoal gas atmosphere shows no substantial agglomeration into dense lumps when compared with the other sample, the zinc oxide sampled is a proper starting material for the preparation of a highly fluorescent product. A French process U. S. P., C. P. or reagent grade zinc oxide rarely is shown by this test to be a proper starting material. If, as is even more rarely the case, a French process zinc oxide is found to contain sulphur dioxide by the starch-iodine test, it may be considered a proper starting material and the foregoing comparative heating test is unnecessary. A spectroscopically pure grade of French process zinc oxide, if it is not a proper starting material, agglomerates into hard, sandy granules rather than dense lumps when heated in a charcoal gas atmosphere in the foregoing comparative heating test.

*Example 2*

If, as is ordinarily the case, a French process zinc oxide is shown, by the tests in Example 1, not to be a proper starting material, it is treated as follows: Its moisture content is determined by heating a small sample to constant weight at 110° C. If the moisture content is less than about .075% by weight, the zinc oxide is steamed or moisture is added to bring the moisture content up to that value, in order to accelerate the action of sulphur dioxide in the next step. The zinc oxide is sifted through a fine screen to fluff it up and then a 50 gram batch is agitated for one minute in a 250 ml. flask containing sulphur dioxide at atmospheric pressure. The resulting product is shown to contain sulphur dioxide by the starch-iodine test, and is a proper starting material for the preparation of a highly fluorescent product. If it is then held at a temperature of about 500° C. or above, for example at 800° C. for thirty minutes, and cooled, it no longer shows the presence of sulphur dioxide, but it is still a proper starting material. A proper starting material, prepared as described in the present example, when subjected to the comparative heating test described in Example 1, agglomerates substantially no more in the charcoal gas atmosphere than in the sulphur dioxide atmosphere.

*Example 3*

About 100 grams of a French process zinc oxide that has been found, by the tests described in Example 1, not to be a proper starting material for the preparation of a highly fluorescent product is held in an electric furnace in an open porcelain crucible at 800 to 1000° C. for one-half hour in a slow current of gas consisting of 95% hydrogen and 5% sulphur dioxide. Under these conditions the sulphur dioxide first converts the zinc oxide into a proper starting material and the hydrogen then converts the material into a product that when cooled is highly fluorescent. At the end of the period of one-half hour the crucible with its contents is removed and allowed to cool in the air to obtain the highly fluorescent product. In the foregoing procedure the time and temperature may be varied within wide limits depending upon the size of the batch, the nature of the zinc oxide and the design of the furnace. The concentration of sulphur dioxide that gives the best results varies with the specific nature of the zinc oxide used. The hydrogen may be replaced in whole or in part by carbon monoxide or by charcoal gas. If in the foregoing procedure the sulphur dioxide is omitted from the atmosphere, the fluorescence of the resulting product is reduced at least 50 to 80% and is not sufficient for commercial use.

*Example 4*

A procedure is carried out which is the same as that of Example 3 except that 0.3 gram of zinc sulphide is added to the starting material and the sulphur dioxide is omitted from the gas introduced into the furnace. At the furnace temperature the zinc sulphide produces sulphur dioxide within the charge so that the final product is similar to that obtained in Example 3.

*Example 5*

About 10 grams of a French process zinc oxide that has been identified as a proper starting material by a test described in Example 1 or has been prepared as described in Example 2 is placed in a small electric arc furnace provided with carbon electrodes. The furnace is provided with a vent just large enough to relieve any pressure caused by generation of gases during the heating operation. The zinc oxide is heated for several minutes under the arc. The atmosphere in the furnace contains carbon monoxide formed from the carbon electrodes. The zinc oxide, upon being cooled in the air, is highly fluorescent.

*Example 6*

About 10 grams of a French process zinc oxide that has been identified as a proper starting material by a test described in Example 1 or has been prepared as described in Example 2 is placed in an open porcelain crucible and is held at temperatures from 800 to 1000° C. in an electric furnace for about 15 minutes while a slow stream of pure carbon monoxide or hydrogen is passed through the furnace. Upon being cooled in the air the resulting product is highly fluorescent and of very fine particle size.

*Example 7*

About 10 grams of C. P. zinc showing traces of sulphur on analysis is placed in a combustion tube and held at about 1000° C. while a stream of water vapor is passed slowly through the tube. The zinc vaporizes and reacts with the water vapor to form incandescent zinc oxide and hydrogen. Since the sulphur in the zinc is converted to sulphur dioxide, the atmosphere in contact with which the zinc oxide is formed in an incandescent state contains sulphur dioxide as well as hydrogen. The zinc oxide formed under these conditions, when cooled, is highly fluorescent. The water vapor introduced into the tube may contain hydrogen in a concentration insufficient to prevent the oxidation of the zinc to zinc oxide.

*Example 8*

About 20 grams of C. P. zinc is placed in a clay boat and is held at 800 to 1000° C. in an electric furnace while there is passed through the furnace a gas consisting of 11% carbon monoxide, 14% carbon dioxide, 74% nitrogen and 1.0% hydrogen. A small amount of sulphur dioxide is bled into the furnace with such gas. The zinc vaporizes and the zinc vapor oxidizes to zinc oxide. When removed from the furnace and cooled in the air, the product is highly fluorescent.

Various embodiments of the invention may be devised to meet various requirements.

Having described the invention, I claim:

1. An improvement in the process of producing fluorescent zinc oxide by exposing incandescent French process zinc oxide to a gaseous reducing atmosphere, characterized by the step of contacting the zinc oxide with an atmosphere containing sulfur dioxide within a time ranging from a time prior to and up to and including the time when the zinc oxide reaches a state of incandescence, thereby maintaining a substantially constant zinc oxide particle size during the exposure of the incandescent zinc oxide to a gaseous reducing atmosphere.

2. A process as claimed in claim 1 in which the gaseous reducing atmosphere contains carbon monoxide and carbon dioxide.

3. A process as claimed in claim 1 in which the gaseous reducing atmosphere contains hydrogen.

4. A process as claimed in claim 1 in which the zinc oxide is produced in situ by oxidation reaction of zinc with an oxygen donor gas present in the reducing atmosphere, said oxygen donor gas being present in an amount insufficient to oxidize the reducing gases present.

5. A process as claimed in claim 4 in which the oxygen donor gas is steam.

6. A method of preparing fluorescent French process zinc oxide pigment, that comprises exposing French process zinc oxide pigment, in an incandescent state and prior to substantial agglomeration thereof, to a gaseous reducing atmosphere that contains sulfur dioxide, thereby maintaining a pigment particle size during the process.

7. A method of imparting fluorescence to a French process zinc oxide, that comprises heating the zinc oxide to incandescence in a gaseous reducing atmosphere that contains sulfur dioxide, thereby maintaining a substantially constant zinc oxide particle size during the process.

8. A method of imparting fluorescence to a French process zinc oxide, that comprises the steps of (1) contacting the zinc oxide with an atmosphere containing sulfur dioxide and (2) then contacting the zinc oxide, in an incandescent state, with a gaseous reducing atmosphere for imparting fluorescence thereto, step (1) causing the zinc oxide to maintin a substantially constant particle size during step (2).

9. A method of producing a fluorescent zinc oxide, that comprises exposing a sulfur dioxide containing French process zinc oxide pigment, in an incandescent state, to a gaseous reducing atmosphere, the sulfur dioxide causing the maintenance of a pigment particle size during the process.

10. A method of preparing an oxide of zinc in a highly fluorescent state that comprises (1) introducing a French process zinc oxide into a heating zone and heating the zinc oxide to incandescence, (2) introducing into the heating zone a gaseous reducing atmosphere, so as to impart fluorescence to the incandescent zinc oxide, and (3) bringing the zinc oxide in contact with a sulfur dioxide-containing atmosphere prior to imparting fluorescence thereto so as to maintain a substantially constant zinc oxide particle size during the imparting of fluorescence thereto.

11. A method as claimed in claim 10 wherein the introduction of the zinc oxide into the heating zone and the heating to incandescence are accomplished simultaneously by oxidation of zinc vapor.

BENJAMIN L. HIRSCH.

REFERENCES CITED

The following references are of record in the file of this patent:

UNITED STATES PATENTS

| Number | Name | Date |
|---|---|---|
| 715,238 | Bartlett | Dec. 9, 1902 |
| 1,339,544 | Breyer et al. | May 11, 1920 |
| 1,523,417 | Grine | Jan. 20, 1925 |
| 1,574,317 | Utley et al. | Feb. 23, 1926 |
| 1,647,279 | De Saulles | Nov. 1, 1927 |
| 1,670,169 | Singmaster | May 15, 1928 |
| 1,781,702 | Pierce | Nov. 18, 1930 |
| 1,941,569 | McCraven | Jan. 2, 1934 |
| 2,141,228 | Singh | Dec. 27, 1938 |
| 2,408,475 | Nickle | Oct. 1, 1946 |

FOREIGN PATENTS

| Number | Country | Date |
|---|---|---|
| 558,213 | Great Britain | Dec. 24, 1943 |

OTHER REFERENCES

Beutel and Kutzelnigg, "Monatshefte Fur Chemie," Band 61, pages 69-86 (1932).

Eisenbrandt and Siewert, "Archives Pharmacy," vol. 272, pages 440-451 (1934).

Mellor, "Modern Inorganic Chemistry," 1939 edition, page 451.

Mellor, "Comprehensive Treatise on Inorganic and Theoretical Chemistry," vol. 4, pages 513, 514 (1923).

Leverenz, "Phosphors Versus the Periodic System of Elements," Proceedings of the Institute of Radio Engineers, May 1944, pages 256-263.